United States Patent [19]

Sadler et al.

[11] Patent Number: 4,626,559

[45] Date of Patent: Dec. 2, 1986

[54] NON-PERMANENT ORNAMENTAL PAINT MIXTURE

[75] Inventors: Wanda H. Sadler, Smith County; John Milligan, Bexar County; Jerry W. Parks, Dallas County, all of Tex.

[73] Assignee: Pep Rally Paint, Inc., Dallas, Tex.

[21] Appl. No.: 725,766

[22] Filed: Apr. 22, 1985

[51] Int. Cl.$^4$ .................. C09D 5/02; C09D 5/14; C09D 5/20; C09D 5/28

[52] U.S. Cl. .................. 523/122; 523/334; 524/501

[58] Field of Search ............... 523/122, 334

[56] References Cited

U.S. PATENT DOCUMENTS

| | | | |
|---|---|---|---|
| 3,035,004 | 5/1962 | Glavis | 524/522 |
| 3,408,319 | 10/1968 | Rau | 525/7 |
| 3,936,555 | 2/1976 | Smith | 428/287 |
| 3,971,745 | 7/1976 | Carlson et al. | 523/402 |
| 4,005,033 | 1/1977 | Georgeau et al. | 521/59 |
| 4,143,019 | 3/1979 | Burley | 524/401 |
| 4,314,802 | 2/1982 | Beier et al. | 252/8.57 |
| 4,334,876 | 6/1982 | Beier et al. | 428/473 |
| 4,403,003 | 9/1983 | Backhouse | 427/407.2 |
| 4,471,082 | 9/1984 | Kwok et al. | 524/571 |

OTHER PUBLICATIONS

"Acrysol Ase Thickners" Polymers, Resins and Monomers Textiles, pp. 1-7, Rohm & Haas Company 1981.
Acrysol Ase-60 "Polymers, Resins and Monomers" Graphic Arts, pp. 1-15, Rohm & Haas Co. 1978.
"Dow Corning Silicones for Polish Formulators" Dow Corning Corp. 1979, pp. 1-3.
"Tamol 850" Rohm & Haas 1979 Paper Chemicals, pp. 1-7.

Primary Examiner—Herbert J. Lilling
Attorney, Agent, or Firm—Harry C. Post, III

[57] ABSTRACT

A non-permanent ornamental paint mixture that is water soluble after drying. The mixture comprises a first solution of a mixture consisting essentially of water, defoamer, dispersing agent, filler and antimicrobial agent. A second solution is mixed with the first solution and comprises a mixture consisting essentially of water, an acid containing, cross-linked acrylic emulsion copolymer, defoamer, a release agent and alkali. An aqueous pigment dispersion is used in the paint mixture to provide the color.

20 Claims, No Drawings

NON-PERMANENT ORNAMENTAL PAINT MIXTURE

Athletic sponsors and boosters frequently decorate their cars, trucks and similar vehicles to indicate their support of their chosen team. Generally this decoration includes slogans and statements written on the vehicle's exterior with paint or shoe polish. The application of the paint or shoe polish to the vehicle's exterior paint injures the paint through discoloration or dying. Thus, requiring the vehicle to be refinished which is wasteful and costly.

Accordingly, it is an object of the present invention to provide a non-permanent ornamental paint mixture.

Further, it is an object of the present invention to provide a non-permanent ornamental paint mixture that is water soluble after drying.

Further, it is an object of the present invention to provide a non-permanent ornamental paint mixture that will not damage a vehicle's exterior finish after drying.

In accordance with the invention, a non-permanent ornamental paint mixture is provided that is water soluble after drying and will not damage a vehicle's exterior finish after drying. The paint mixture comprises a first solution consisting essentially of approximately 50 parts by weight water, of up to 1.0 parts by weight defoamer, of approximately 0.25 dispersing agent, of approximately 56 parts by weight of a filler and of approximately 0.02 parts by weight antimicrobial agent. A second solution is used in the paint mixture and consists essentially of approximately 110 parts by weight water, of approximately 20 parts by weight an acid containing, cross-linked acrylic emulsion copolymer, of up to 1.0 parts by weight defoamer, of approximately 3.0 parts by weight release agent and of approximately 0.625 parts by weight alkali. The paint mixture also comprises an aqueous pigment dispersion of from about 6 to about 16 parts by weight.

Further, in accordance with the invention, a non-permanent ornamental paint mixture is provided that is water soluble after drying and will not damage a vehicle's exterior finish after drying. The paint mixture comprises a first solution of approximately 106 parts by weight of a mixture consisting essentially of water, defoamer, dispersing agent, filler, and antimicrobial agent. A second solution is provided in the paint mixture of approximately 133.5 parts by weight of a mixture consisting essentially of water, an acid containing, cross-linked acrylic emulsion copolymer, defoamer, a release agent and alkali. Also, the paint mixture comprises an aqueous pigment dispersion of from about 6 to about 16 parts by weight.

Any conventional material well known in the art may be used as the defoamer to prevent the entrainment of air during mixing in the paint mixture. However, the preferred defoamer is a non-silicone polymer sold under the trade name B.Y.K. 035.

Any conventional material well known in the art may be used as the dispersing agent to wet the particles in the paint mixture. However, the preferred dispersing agent is an aqueous solution with approximately thirty percent (30%) by weight acrylic polymer sold by Rohm and Haas Company under the trade name TAMOL 850.

Any conventional material well known in the art may be used as the filler to carry pigment in the paint mixture. However, the preferred filler is selected from the group consisting of calcium carbonate, such as that sold under the trade name Snowflake, and magnesium silicate. The preferred filler is a mixture of magnesium silicate and calicum carbonate in a weight ratio of between 5:95 and 15:85.

Any conventional material well known in the art may be used as the antimicrobial agent to inhibit the growth of bacteria in the paint mixture. However, the preferred antimicrobial agent is a white powder having approximately 67.5 percent an active ingredient of 1-(3-chloroallyl)-3,5,7-triaza-1-azoniaadamantane chloride and approximately 32.5 percent inert ingredients, including a minimum of 23.0 percent sodium bicarbonate, and is sold by Dow Corning Company under the trade name Dowicil.

The acid containing, cross-linked acrylic emulsion copolymer is used to inhibit the removal of the pigment after drying by wiping. The preferred copolymer is sold as a thickening agent by Rohm and Haas Company under the trade name Acrysol ASE-60. This preferred copolymer has approximately 28.0 percent solids, approximately 3.5 pH, 10 cps (plus or minus 10%) viscosity, 1.054 at 25° C. specific gravity, and an anionic colloidal charge.

The release agent provided in the invention assists in preventing the dried pigment from adhering to the vehicles exterior finish with sufficient strength to prevent removal or damage to the finish. The preferred release agent is a straight chain silicone emulsion polymer sold by Dow Chemical Company under the trade name Dow Silicone #346, which allows the dried paint mixture of the present invention to be removed from the vehicle's finish without discoloration or dying by application of water and slight wiping.

The alkali is provided in the invention to cause the acid containing, cross-linked arcylic emulsion copolymer to swell. The preferred alkali is ammonium hydroxide.

Any conventional material, organic and inorganic, well known in the art may be used as the coloring agent or pigment. However, the preferred coloring agent is a polymeric aqueous pigment dispersion having high pigment content, complete dispersion, non-settling, low surfactant level and free flowing, such as those sold by the Dispersions Division of the Sun Chemical Corporation under the trade name Aqua Tone. These pigment dispersions have a pH range of from 7.5 to 8.5 and at least 25% by weight pigment.

The following examples are presented to illustrate the practice of the invention and not as an indication of the limits or scope thereof.

EXAMPLE I

A violet colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicone polymer defoamer (B.Y.K. 035), followed by 4.0 ounces dispersing agent (TAMOL 850), followed by 56 pounds calcium carbonate filler (Snowflake) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 6 pounds aqueous pigment dispersion added to the solution. The aqueous pigment dispersion is a carbazole violet pigment type, is 25% by weight pigment, has a pH range of 7.5–8.5, has a 1.02 specific gravity and is sold by Sun Chemical Corporation under Color Index Name Violet 23, Color Index No. 51319. The resultant paint mixture is then tested to determine whether or not its pH range is from 7 to 9.5. Additional alkali was found to be necessary and 10.0 ounces of sodium hydroxide was added to the mixture to adjust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

EXAMPLE II

A green colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicone polymer defoamer (B.Y.K. 035), followed by 4.0 ounces dispersing agent (TAMOL 850), followed by 56 pounds calcium carbonate filler (Snowflake) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 9 pounds aqueous pigment dispersion added to the solution. The aqueous pigment dispersion is a mixture of 3 pounds diarylide yellow pigment type, which is 40% by weight pigment, has a pH range of 7.5–8.5, a 1.16 specific gravity and is sold by Sun Chemical Corporation under Color Index Name Yellow 14, Color Index No. 21095, and 6 pounds phthalocyanine green pigment type, which is 45% by weight pigment, has a pH range of 7.5–8.5, a 1.31 specific gravity and is sold by Sun Chemical Corporation under Color Index Name Green 7, Color Index No. 74260. The resultant paint mixture is then tested to determine whether or not its pH range is from 7 to 9.5. Additional alkali was found to be necessary and 5.0 ounces of sodium hydroxide was added to the mixture to adust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

EXAMPLE III

An blue colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicone polymer defoamer (B.Y.K. 035), followed by 4.0 ounces dispersing agent (TAMOL 850), followed by 56 pounds calcium carbonate filler (Snowflake) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 8.25 pounds aqueous pigment dispersion added to the solution. The aqueous pigment dispersion is a mixture of 8 pounds phthalocyanine blue pigment type, which is 45% by weight pigment, has a pH range of 7.5–8.5, a 1.23 specific gravity and is sold by Sun Chemical Corporation under Color Index Name Blue 15, Color Index No. 74160, and 4 ounces carbazole violet pigment type, which is 25% by weight pigment, has a pH range of 7.5–8.5, a 1.02 specific gravity and is sold by Sun Chemical Corporation under Color Index Name Violet 23, Color Index No. 51319. The resultant paint mixture is the tested to determine whether or not its pH range is from 7 to 9.5. Additional alkali was found to be necessary and 8 ounces of sodium hydroxide was added to the mixture to adjust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

EXAMPLE IV

An orange colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicone polymer defoamer (B.Y.K. 035), followed by 4.0 ounces dispersing agent (TAMOL 850), followed by 56 pounds calcium carbonate filler (Snowflake) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 8 pounds aqueous pigment dispersion added to the solution. The aqueous pigment dispersion is a dinitroanline orange pigment type, is 40% by weight pigment, has a pH range of 7.5–8.5 and a 1.17 specific gravity and is sold by Sun Chemical Corporation under Color Index Name Orange 5, Color Index No. 12075. The resultant paint mixture is then tested to determine whether or not its pH range is from 7 to 9.5. Additional alkali was found to be necessary and 5 ounces of sodium hydroxide was added to the mixture to adjust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

EXAMPLE V

An yellow colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicone polymer defoamer (B.Y.K. 035), followed by 4.0 ounces dispersing agent (TAMOL 850), followed by 56 pounds calcium carbonate filler (Snowflake) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 14 pounds aqueous pigment dispersion added to the solution. The aqueous pigment dispersion is a diarylide yellow pigment type, is 40% by weight pigment, has a pH range of 7.5-8.5 and a 1.16 specific gravity and is sold by Sun Chemical Corporation under Color Index Name Yellow 14, Color Index No. 21095. The resultant paint mixture is then tested to determine whether or not its pH range is from 7 to 9.5. Additional alkali was found to be necessary and 10 ounces of sodium hydroxide was added to the mixture to adjust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

EXAMPLE VI

An yellow colored novel non-permanent ornamental paint mixture was made by preparing a substantially homogeneous first solution of approximately 106 pounds and a substantially homogeneous second solution of approximately 133.5 pounds. The first solution is prepared by continuously mixing into 50 pounds of water approximately 3.0 ounces non-silicon polymer defoamer (B.Y.K. 035), followed by 4.0 ounces dispersing agent (TAMOL 850), followed by 56 pounds filler (a mixture of 50 pounds magnesium silicate and 6 pounds calcium carbonate) and followed by 10 grams antimicrobial agent (Dowicil). The second solution is prepared by continuously mixing into 110 pounds of water 20 pounds acid containing, cross-linked acrylic emulsion copolymer (Acrysol ASE-60), followed by 0.5 ounces non-silicone polymer defoamer (B.Y.K. 035), followed by 3 pounds straight chain silicone emulsion polymer release agent (Dow Silicone) and followed by 10.0 ounces of alkali (ammonium hydroxide). The first and second solutions were then mixed together to obtain a homogeneous solution and 14 pounds aqueous pigment dispersion added to the solution. The aqueous pigment dispersion is a diarylide yellow pigment type, is 40% by weight pigment, has a pH range of 7.5-8.5 and a 1.16 specific gravity and is sold by Sun Chemical Corporation under Color Index Name Yellow 14, Color Index No. 21095. The resultant paint mixture is then tested to determine whether or not its pH range is from 7 to 9.5. Additional alkali was found to be necessary and 10 ounces of sodium hydroxide was added to the mixture to adjust the pH to within the designated range. After the paint mixture was applied to a sample of the vehicle's external finish and allowed to dry for at least 12 hours, free flowing water was directed against the dried paint mixture and with light wiping the non-permanent ornamental paint mixture of the present invention was removed without damage to the finish.

The invention having been described, what is claimed is:

1. A non-permanent ornamental paint mixture being water soluble after drying, comprising: a first solution consisting essentially of approximately 50 parts by weight water, of up to 1.0 parts by weight defoamer, of approximately 0.25 dispersing agent, of approximately 56 parts by weight filler and of approximately 0.02 parts by weight antimicrobial agent; a second solution consisting essentially of approximately 110 parts by weight water, of approximately 20 parts by weight an acid containing, cross-linked acrylic emulsion copolymer, of approximately up to 1.0 parts by weight defoamer, of approximately 3.0 parts by weight release agent and of approximately 0.625 parts by weight alkali; and an aqueous pigment dispersion of from about 6 to about 16 parts by weight.

2. A paint mixture as set forth in claim 1, further comprising: the antimicrobial agent having an active ingredient of 1-(3-chloroally)-3,5,7-triaza-1-azoniaadamantane chloride.

3. A paint mixture as set forth in claim 1, further comprising: the dispersing agent consisting essentially of 30.0 parts by weight of an acrylic polymer and 70.0 parts by weight of water.

4. A paint mixture as set forth in claim 1, further comprising: the release agent consisting essentially of a straight chain silicone emulsion polymer.

5. A paint mixture as set forth in claim 1, further comprising: a pH of from about 7 to 9.5.

6. A paint mixture as set forth in claim 5, further comprising: the antimicrobial agent having an active ingredient of 1-(3-chloroallyl)-3,5,7-triaza-1-azoniaadamantane chloride.

7. A paint mixture as set forth in claim 6, further comprising: the dispersing agent consisting essentially of 30.0 parts by weight of an acrylic polymer and 70.0 parts by weight of water.

8. A paint mixture as set forth in claim 7, further comprising: the release agent consisting essentially of a straight chain silicone emulsion polymer.

9. A paint mixture as set forth in claim 1, further comprising: the alkali being ammonium hydroxide.

10. A non-permanent ornamental paint mixture being water soluble after drying, comprising: a first solution of approximately 106 parts by weight of a mixture consisting essentially of water, defoamer, dispersing agent, filler and antimicrobial agent; a second solution of approximately 133.5 parts by weight of a mixture consisting essentially of water, an acid containing, cross-linked acrylic emulsion copolymer, defoamer, a release agent and alkali; and an aqueous pigment dispersion of from about 6 to about 16 parts by weight.

11. A paint mixture as set forth in claim 10, further comprising: the antimicrobial agent having an active ingredient of 1-(3-chloroallyl)-3,5,7-triaza-1-azoniaadamantane chloride.

12. A paint mixture as set forth in claim 10, further comprising: the dispersing agent consisting essentially of 30.0 parts by weight of an acrylic polymer and 70.0 parts by weight of water.

13. A paint mixture as set forth in claim 10, further comprising: the release agent consisting essentially of a straight chain silicone emulsion polymer.

14. A paint mixture as set forth in claim 10, further comprising: a pH of from about 7 to 9.5

15. A paint mixture as set forth in claim 14, further comprising: the antimicrobial agent having an active ingredient of 1-(3-chloroallyl)-3,5,7-triaza-1-azoniaadamantane chloride.

16. A paint mixture as set forth in claim 15, further comprising: the dispersing agent consisting essentially of 30.0 parts by weight of an acrylic polymer and 70.0 parts by weight of water.

17. A paint mixture as set forth in claim 16, further comprising: the release agent consisting essentially of a straight chain silicone emulsion polymer.

18. A paint mixture as set forth in claim 17, further comprising: the first solution consisting essentially of approximately 50 parts by weight water, of up to 1.0 parts by weight defoamer, of approximately 0.25 dispersing agent, of approximately 56 parts by weight filler and of approximately 0.02 parts by weight antimicrobial agent; and the second solution consisting essentially of approximately 110 parts by weight water, of approximately 20 parts by weight an acid containing, cross-linked acrylic emulsion copolymer, of up to 1.0 parts by weight defoamer, of approximately 3.0 parts by weight release agent and of approximately 0.625 parts by weight ammonium hydroxide.

19. A paint mixture as set forth in claim 10, further comprising: the first solution consisting essentially of approximately 50 parts by weight water, of up to 1.0 parts by weight defoamer, of approximately 0.25 dispersing agent, of approximately 56 parts by weight filler and of approximately 0.02 parts by weight antimicrobial agent; and the second solution consisting essentially of approximately 110 parts by weight water, of approximately 20 parts by weight an acid containing, cross-linked acrylic emulsion copolymer, of up to 1.0 parts by weight defoamer, of approximately 3.0 parts by weight release agent and of approximately 0.625 parts by weight ammonium hydroxide.

20. A paint mixture as set forth in claim 10, further comprising: the alkali being ammonium hydroxide.

* * * * *